United States Patent Office 3,412,138
Patented Nov. 19, 1968

3,412,138
ALKYLATION OF TYROSINE
Samuel L. Solar, San Jose, and Robert R. Schumaker, Los Gatos, Calif., assignors to International Business Machines Corporation, Armonk, N.Y., a corporation of New York
No Drawing. Filed Dec. 17, 1965, Ser. No. 514,696
17 Claims. (Cl. 260—471)

ABSTRACT OF THE DISCLOSURE

A method for preparing O-alkyltyrosine and ester of O-alkyltyrosine by reacting tyrosine with alkyl halide in a reaction solvent of dimethyl sulfoxide under a highly alkaline condition. Examples of compounds by this method include O-butyltyrosine, heptyl-O-heptyltyrosine, O-octadecyltyrosine, and phenethyl-O-phenethyltyrosine. The O-alkyltyrosine compounds are useful as monomers in the preparation of polypeptides and the esters of O-alkyltyrosine have utility because of their antifungal and antibacterial activity.

---

The present invention relates to the alkylation of tyrosine and, more particularly, releases to O-alkylation of tyrosine.

The prior art method for preparing O-alkyltyrosine consists of the following three separate steps and the preparation of the ester of O-alkyltyrosine requires the separate additional step:

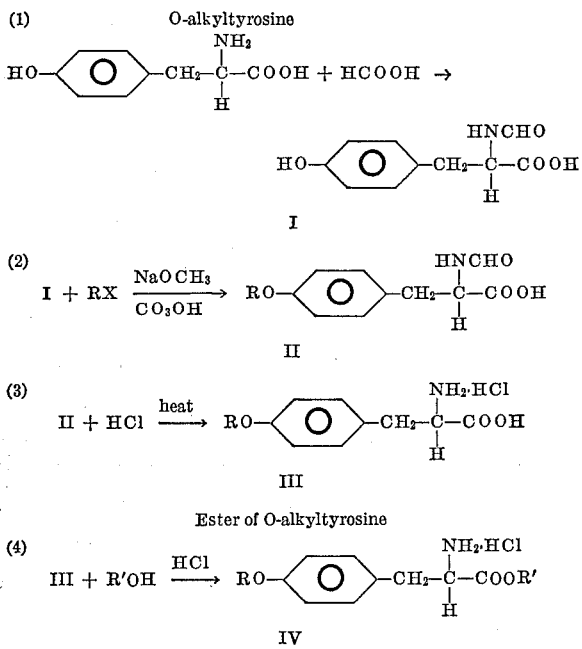

wherein R and R' are alkyl and may or may not be the same.

The above method is not only complex and time-consuming, but the overall yield of O-alkyltyrosine is about 30%.

Accordingly, it is the primary object of the present invention to provide a novel method for preparation of O-alkyltyrosine directly from tyrosine in a single step and thereby provide a method which is simple and easy in operation and takes a relatively short time.

It is a further object of the present invention to provide a novel process for the preparation of O-alkyltyrosine in relatively high yields.

It is still another object of the present invention to provide a novel process in which the same reaction step used in the preparation of O-alkyltyrosine can be utilized to prepare the ester of O-alkyltyrosine.

The foregoing and other objects of the present invention are achieved by carrying out the O-alkylation in a reaction solvent of dimethyl sulfoxide. In general, the process of the present invention is as follows:

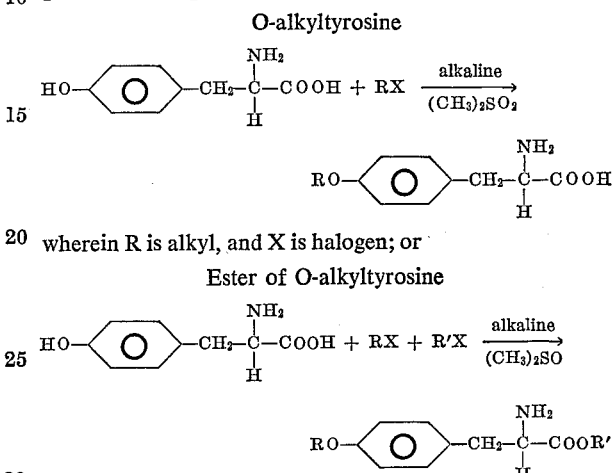

wherein R is alkyl, and X is halogen; or

Ester of O-alkyltyrosine $$HO-\langle O \rangle-CH_2-\overset{NH_2}{\underset{H}{C}}-COOH + RX + R'X \xrightarrow[(CH_3)_2SO]{alkaline}$$

$$RO-\langle O \rangle-CH_2-\overset{NH_2}{\underset{H}{C}}-COOR'$$

wherein R and R' are the same alkyl, and X is halogen.

More specifically, a solution of tyrosine in a mixture of dimethyl sulfoxide and a strongly alkaline acid acceptor or base, such as aqueous sodium hydroxide, is treated with the halide (usually bromide) of the desired alkyl at a temperature of above about 50° C. Other acid acceptors useful in the method of the present invention are potassium hydroxide, lithium hydroxide, tetramethylammonium hydroxide, and benzyltrimethylammonium hydroxide. Preferably, to obtain the highest yields of O-alkyltyrosine, at least about two equivalents of the acid acceptor, such as 10–25 percent sodium hydroxide, per mole of tyrosine in about 3–10 volumes of dimethyl sulfoxide are used and the reaction is carried out at a temperature of about 70–90° C. The major by-product in the preparation of O-alkyltyrosine is the ester of O-alkyltyrosine which results from di-O-alkylation. This by-product can be minimized by carrying out of the reaction with a slight excess of tyrosine or essentially eliminated by saponification with a dilute base, such a dilute sodium hydrovide, before isolation of the ether.

Conversely, if the ester of O-alkyltyrosine is the desired major product, it can be obtained in higher yields by adding at least about two equivalents of alkyl halide per mole of tyrosine and by using more concentrated sodium hydroxide. When the ester of O-alkyltyrosine is low melting, such as n-heptyl-O-heptyltyrosinate, and tends to separate from the reaction mixture as an oil, it is advantageous to isolate the ester product as a dibasic salt of sulfuric acid of the following formula:

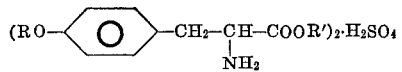

wherein R and R' are the same alkyl.

This can be done by pouring the reaction mixture into ice containing an amount of sulfuric acid slightly in excess of the amount necessary to form the salt. The dibasic salt which precipitates is filtered off, dried, and recrystallized. To regenerate the ester of O-alkyltyrosine in high yields (>70%), the dibasic salt of sulfuric acid is treated with an aqueous solution or suspension of base, such as powdered calcium carbonate, and then extracted with ether, prepared by the same method as O-butyltyrosine and O-n-hexyltyrosine of Examples I and II.

| R | Yield percent | M.P., ° C. | Analysis | | | | | |
|---|---|---|---|---|---|---|---|---|
| | | | Calculated | | | Found | | |
| | | | C | H | N | C | H | N |
| n-Heptyl | 82 | 225.0–227.0 | 68.79 | 9.02 | 5.01 | 69.15 | 9.10 | 4.88 |
| Phenethyl | 42 | 229.0–230.0 | 71.56 | 6.71 | 4.91 | 71.73 | 6.84 | 4.67 |
| n-Decyl | 76 | 218.0–220.0 | 70.99 | 9.72 | 4.35 | 71.25 | 9.75 | 4.27 |
| n-Octadecyl | 74 | 215.0–217.0 | 74.78 | 10.92 | 3.23 | 74.10 | 10.72 | 3.45 | such as diethyl ether. The resulting ether solution is dried, such as over anhydrous sodium sulfate, filtered, evaporated to dryness at reduced pressure, and the residue recrystallized.

The O-alkyltyrosine compounds are useful as monomers in the preparation of polypeptides and as intermediates in the preparation of esters of O-alkyltyrosine by the above method of the prior art wherein R and R' are not the same. The esters of O-alkyltyrosine are useful because of their antifungal and antibacterial activity (see U.S. Patent 2,833,810).

The following examples are given to further illustrate the invention but are not to be construed as limiting the invention. Examples I through VI describe the preparation of O-alkyltyrosine as the major product. Examples VII through XII describe the preparation of the ester of O-alkyltyrosine.

EXAMPLE I

A solution was prepared from 18.2 g. (0.1 mole) tyrosine in 16 g. (0.2 mole) 50% NaOH. The solution was diluted with 350 ml. dimethyl sulfoxide and heated to 70–75° C. on a water bath. To this was added a n-butylbromide (13.5 g., 0.1 mole) and the mixture was stirred at 70–75° C. for three hours, after which it was poured into 500 g. of crushed ice. Adjustment of the pH to 8.5 by addition of a few ml. dilute HCl yielded a voluminous precipitate of O-butyltyrosine which was filtered and washed with water. This solid product was dissolved in 200 ml. hot 3 N HCl and filtered. Upon cooling, silky white needles of O-butyltyrosine·HCl crystallized out. After being filtered off, washed with cold water, and dried, this HCl product was recrystallized from 60% acetic acid to give 11 g. (45% yield) M.P.=231–2° C. (dec.).

*Analysis.*—Calculated: C, 65.79; H, 8.07; N, 5.90. Found: C, 65.90; H, 8.43; N, 5.84.

EXAMPLE II

A solution of 9.1 g. (0.05 mole) tyrosine in 40 g. (0.10 mole) 10% aqueous sodium hydroxide was added to 200 ml. dimethyl sulfoxide and heated in a water bath to 80° C. To this was added, with stirring, 8.25 g. (0.05 mole) 1-bromohexane. Heating and stirring were continued for 2 hours and the reaction mixture was then poured into 250 g. crushed ice. The pH was adjusted to approximately 7.5 and the resulting precipitate was filtered off, washed with water, and dried. The crude product was recrystallized from 60% acetic acid to give 9.6 g. (71.6% yield) of white leaflets of O-n-hexyltyrosine. M.P.=233.0–233.5.

*Analysis.*—Calculated: C, 67.89; H, 8.74; N, 5.90. Found: C, 67.25; H, 8.86; N, 5.41.

EXAMPLES III–VI

O-alkyltyrosine compounds of the formula:

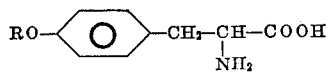

wherein R is alkyl, listed in the following table were prepared by the same method as O-butyltyrosine and O-n-hexyltyrosine of Examples I and II.

EXAMPLE VII

A solution was prepared from 18.2 g. (0.1 mole) tyrosine in 17.6 g. (0.22 mole) 50% sodium hydroxide. The solution was diluted with 350 ml. dimethyl sulfoxide and heated to 70–75° C. on a water bath. To this is added 35.8 g. (0.2 mole) 1-bromoheptane, and the mixture is stirred at 70–75° C. for three hours, after which the reaction mixture is poured into 500 g. crushed ice and the product n-heptyl-O-heptyltyrosinate precipitated as an oil. The oil was extracted with diethyl ether and, after recovery by evaporation of the ether, recrystallized from hexane. Yield=18.2 g. (50%).

Alternatively, a reaction mixture, prepared by the above procedure, was poured into 500 g. crushed ice containing 50 g. 20% H₂SO₄. The dibasic n-heptyl-O-heptyltyrosinate salt of sulfuric acid was filtered off, washed with cold water, dried and recrystallized from 95% ethanol. Yield=30.6 g. (75%). M.P. 222.0–224.0° C.

*Analysis.*—Calculated: C, 64.79; H, 9.39; N, 3.29; S, 3.76. Found: C, 64.22; H, 9.22; N, 3.20; S, 3.76.

This salt of sulfuric acid (25 g.) then was stirred with a suspension of 10 g. CaCO₃ in 100 ml. H₂O. The mixture was extracted with diethyl ether, and the ether solution dried over anhydrous sodium sulfate. After the ether was removed by evaporation at reduced pressure, the residue of n-heptyl-O-heptyltyrosinate was recrystallized from hexane. Yield=15.9 g. (70% of dibasic salt); M.P. 82.0–83.0° C.

*Analysis.*—Calculated: C, 73.17 H, 10.41; N, 3.71. Found: C, 73.21; H, 10.10; N, 3.83.

EXAMPLE VIII

A mixture of 9.1 g. (0.05 mole) tyrosine in 8.0 g. (0.10 mole) 50% aqueous sodium hydroxide and 500 ml. dimethyl sulfoxide was heated to approximately 120° C. to form a clear solution. The solution was cooled to 60–70° C. and 20.4 g. (0.11 mole) (2-bromethyl) benzene was added with stirring. The temperature was raised to 115–125° and heating and stirring were continued for 1 hour. Then, the reaction mixture was poured into 500 g. crushed ice and the aqueous suspension was extracted with 3 100-ml. portions of diethyl ether. This ether solution was dried over anhydrous sodium sulfate, filtered, evaporated to dryness at reduced pressure, and the residue of phenethyl-O-phenethyltyrosinate recrystallized from a large volume of hexane to give 8.1 g. (42% yield) of white crystals. M.P.=69.5–70.5° C.

*Analysis.*—Calculated: C, 77.25; H, 7.04; N, 3.71. Found: C, 77.01; H, 7.10; N, 3.73.

EXAMPLES VII–XIII

The esters of O-alkyltyrosine of the formula:

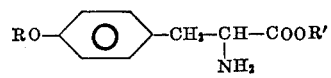

wherein R and R' are the same alkyl, listed in the following table were prepared by the same method as n-heptyl- O-heptyltyrosinate and n-phenethyl-O-phenethyltyrosinate of Examples VII and VIII.

| RR' | Yield, percent | M.P., °C. | Analysis | | | | |
|---|---|---|---|---|---|---|---|
| | | | | C | H | N | S |
| n-Butyl | 31 | 80.5 | Calculated | 69.24 | 9.27 | 4.77 | |
| | | 82.5 | Found | 68.89 | 9.33 | 5.16 | |
| n-Hexyl | 25 | 81.5 | Calculated | 72.20 | 10.03 | 4.01 | |
| | | 82.0 | Found | 71.79 | 10.48 | 4.14 | |
| (¹) | | 231.0 | Calculated | 63.31 | 9.05 | 3.52 | 4.02 |
| | | 232.0 | Found | 63.35 | 8.96 | 3.62 | 4.20 |
| n-Decyl | 15 | 70.0 | Calculated | 75.43 | 11.13 | 3.03 | |
| | | 70.5 | Found | 74.76 | 11.17 | 3.19 | |
| (¹) | | 211.0 | Calculated | 68.23 | 10.19 | 2.75 | 3.14 |
| | | 222.0 | Found | 68.01 | 10.05 | 3.09 | 3.51 |
| n-Octadecyl | 27 | 68.5 | Calculated | 78.83 | 12.11 | 2.04 | |
| | | 70.0 | Found | 78.66 | 12.28 | 2.12 | |

¹ For $(RO-\langle O \rangle-CH_2-CH(NH_2)-COOR')_2 \cdot H_2SO_4$.

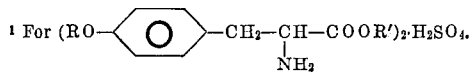

While the invention has been particularly shown and described with reference to preferred embodiments thereof, it will be understood by those skilled in the art that variations in form may be made therein without departing from the spirit and scope of the invention.

What is claimed is:

1. A method of preparing alkyl substituted compounds of tyrosine of the formula:

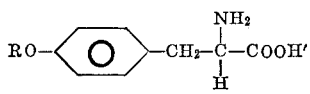

$$RO-\langle O \rangle-CH_2-\overset{NH_2}{\underset{H}{C}}-COOH'$$

wherein R is phenalkyl or unsubstituted alkyl, and R' is selected from the group consisting of hydrogen and phenalkyl and unsubstituted alkyl, comprising the step of:

reacting tyrosine with phenalkyl or unsubstituted alkyl halide in a reaction solvent of dimethyl sulfoxide, at a temperature above about 50° C. and under a highly alkaline condition, said reaction being carried out with up to about one equivalent of the alkyl halide per mole of tyrosine when R' is hydrogen and with at least about two equivalents of the alkyl halide per mole of tyrosine when R' is alkyl.

2. The method of claim 1 wherein the alkaline condition is brought about by the addition of a strongly alkaline acid acceptor.

3. The method of claim 2 wherein R' of the formula of claim 1 is hydrogen and wherein the reaction is carried out with at least about two equivalents of the acid acceptor per mole of tyrosine.

4. The method of claim 3 wherein the reaction is carried out at a temperature between about 70–90° C.

5. The method of claim 4 wherein the alkyl halide is alkyl bromide.

6. The method of claim 1 wherein R is butyl and R' is hydrogen.

7. The method of claim 1 wherein R is hexyl and R' is hydrogen.

8. The method of claim 1 wherein R is heptyl and R' is hydrogen.

9. The method of claim 1 wherein R is phenethyl and R' is hydrogen.

10. The method of claim 1 wherein R is decyl and R' is hydrogen.

11. The method of claim 1 wherein R is octadecyl and R' is hydrogen.

12. The method of claim 1 wherein R and R' are heptyl.

13. The method of claim 1 wherein R and R' are phenethyl.

14. The method of claim 1 wherein R and R' are butyl.

15. The method of claim 1 wherein R and R' are hexyl.

16. The method of claim 1 wherein R and R' are decyl.

17. The method of claim 1 wherein R and R' are octadecyl.

References Cited

UNITED STATES PATENTS 2,833,810   5/1958   Kissman et al. _____ 260—471

LORRAINE A. WEINBERGER, *Primary Examiner.*

L. A. THAXTON, *Assistant Examiner.*

UNITED STATES PATENT OFFICE
CERTIFICATE OF CORRECTION

Patent No. 3,412,138                     November 19, 1968

Samuel L. Solar et al.

It is certified that error appears in the above identified patent and that said Letters Patent are hereby corrected as shown below:

Column 5, lines 31 to 34, the right-hand portion of the formula reading $COOH'$     should read     $COOR'$ Signed and sealed this 26th day of August 1969.

(SEAL)
Attest:

Edward M. Fletcher, Jr.               WILLIAM E. SCHUYLER, JR.
Attesting Officer                         Commissioner of Patents